United States Patent
Hansen et al.

(10) Patent No.: US 9,519,819 B2
(45) Date of Patent: Dec. 13, 2016

(54) METHOD AND ELECTRONIC DEVICE FOR NOISE MITIGATION

(71) Applicant: FINGERPRINT CARDS AB, Gothenburg (SE)

(72) Inventors: Morten Rolle Hansen, Vanløse (DK); Lars Puggaard Bøgild Christensen, Charlottenlund (DK); Hans Thörnblom, Kungsbacka (SE)

(73) Assignee: FINGERPRINT CARDS AB, Göteborg (SE)

( * ) Notice: Subject to any disclaimer, the term of this patent is extended or adjusted under 35 U.S.C. 154(b) by 0 days.

(21) Appl. No.: 14/698,930

(22) Filed: Apr. 29, 2015

(65) Prior Publication Data

US 2016/0012271 A1 Jan. 14, 2016

(30) Foreign Application Priority Data

Jul. 14, 2014 (SE) .................... 1450892-3

(51) Int. Cl.
  *G06K 9/00* (2006.01)
  *G06T 5/00* (2006.01)
  *G06K 9/40* (2006.01)

(52) U.S. Cl.
  CPC ......... *G06K 9/0002* (2013.01); *G06K 9/00067* (2013.01); *G06K 9/40* (2013.01); *G06T 5/002* (2013.01); *G06K 2209/00* (2013.01); *G06T 2207/10004* (2013.01); *G06T 2207/30196* (2013.01)

(58) Field of Classification Search
  CPC .............. G06K 9/00006–9/0012; G06F 21/32; G06F 3/041–3/047; G06F 2203/0338
  See application file for complete search history.

(56) References Cited

U.S. PATENT DOCUMENTS

| | | | | |
|---|---|---|---|---|
| 5,909,501 A | * | 6/1999 | Thebaud | G06K 9/00067 382/124 |
| 5,987,156 A | * | 11/1999 | Ackland | G06K 9/0002 358/446 |
| 6,643,389 B1 | * | 11/2003 | Raynal | G07C 9/00158 356/71 |

(Continued)

FOREIGN PATENT DOCUMENTS

WO    2012163393 A1    12/2012

OTHER PUBLICATIONS

Zhang et al., "3D Biometrics Systems and Applications", Chapter 11, pp. 195-216, Springer New York, 2013.*

(Continued)

*Primary Examiner* — Aaron W Carter
(74) *Attorney, Agent, or Firm* — Remarck Law Group PLC

(57) ABSTRACT

The present invention generally relates to a method for removing disturbances in an image captured by a fingerprint sensor, and specifically to reduction of noise in an acquired fingerprint image by incorporating the sensing principle into the applied method for noise reduction, wherein the noise reduced image is used for determining a representation of a fingerprint pattern. Advantages with the invention include enhanced determination of fingerprint patterns from fingerprint images captured using a fingerprint sensor. The invention also relates to a corresponding electronic device and to a computer program product.

14 Claims, 7 Drawing Sheets

(56) References Cited

U.S. PATENT DOCUMENTS

| | | | |
|---|---|---|---|
| 7,003,142 B1* | 2/2006 | Kruse | G06K 9/76 340/5.53 |
| 7,330,571 B2* | 2/2008 | Svensson | G06K 9/00087 382/124 |
| 8,860,696 B2* | 10/2014 | Wassvik | G06F 3/0412 178/18.01 |
| 8,903,142 B2* | 12/2014 | Storm | G06K 9/00026 382/115 |
| 9,152,841 B1* | 10/2015 | Riedijk | G06K 9/0002 |
| 9,195,878 B2* | 11/2015 | Weber | G06F 3/044 |
| 2002/0146178 A1 | 10/2002 | Bolle et al. | |
| 2003/0126448 A1* | 7/2003 | Russo | G06K 9/00026 713/186 |
| 2005/0083310 A1* | 4/2005 | Safai | G06F 3/03547 345/173 |
| 2005/0111706 A1* | 5/2005 | Bohn | G06K 9/00026 382/124 |
| 2005/0152584 A1* | 7/2005 | Svedin | G06F 21/32 382/124 |
| 2008/0205714 A1* | 8/2008 | Benkley | G06F 3/03547 382/126 |
| 2008/0226124 A1* | 9/2008 | Seo | H04N 1/3217 382/100 |
| 2009/0252384 A1 | 10/2009 | Dean et al. | |
| 2010/0129002 A1 | 5/2010 | Samurov et al. | |
| 2011/0013814 A1* | 1/2011 | Ivanov | G06K 9/00013 382/124 |
| 2012/0057432 A1* | 3/2012 | Hill | E21B 43/11857 367/81 |
| 2014/0003677 A1* | 1/2014 | Han | G06K 9/00006 382/124 |
| 2014/0015774 A1 | 1/2014 | Bussat et al. | |
| 2015/0071502 A1* | 3/2015 | Breznicky | G06K 9/00067 382/115 |
| 2015/0169932 A1* | 6/2015 | Riedijk | G06K 9/001 348/77 |
| 2015/0242673 A1* | 8/2015 | Singhal | G06K 9/00013 345/174 |
| 2016/0012271 A1* | 1/2016 | Hansen | G06K 9/0002 382/124 |

OTHER PUBLICATIONS

PCT International Search Report and Written Opinion dated Oct. 15, 2015 for PCT International Application No. PCT/SE2015/050760, 14 pages.

* cited by examiner

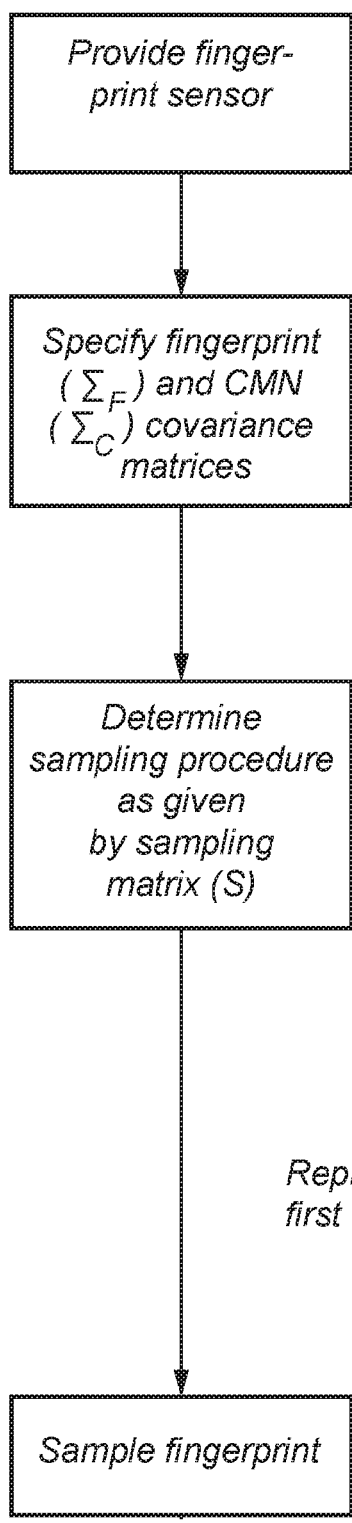
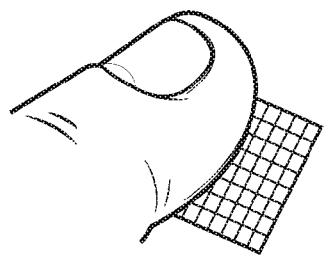
*Fig. 7A*
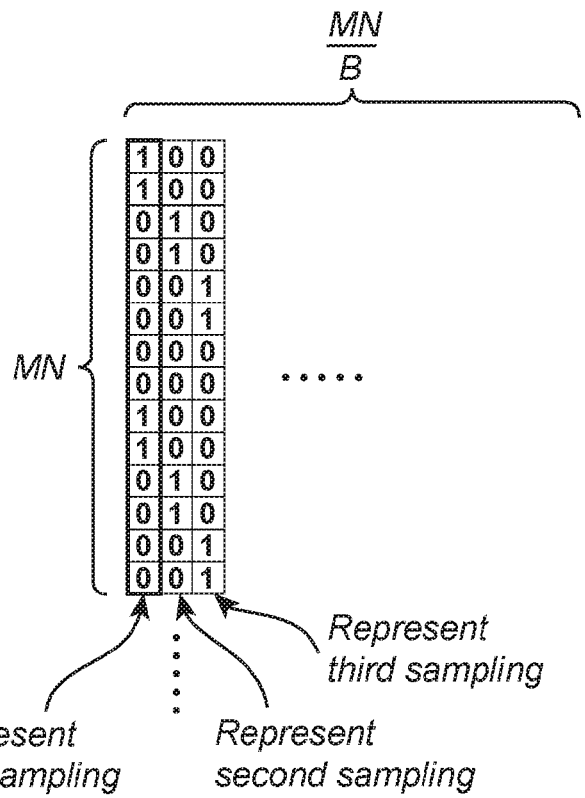
*Fig. 7B*
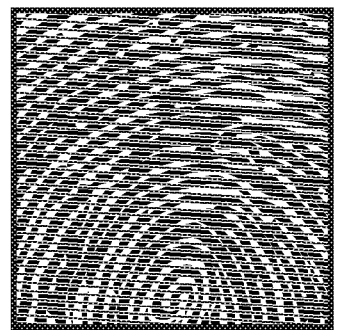
*Fig. 6A*  *Fig. 7C*

METHOD AND ELECTRONIC DEVICE FOR NOISE MITIGATION

CROSS-REFERENCE TO RELATED APPLICATIONS

This application claims priority to Swedish Application No. 1450892-3, filed Jul. 14, 2014. The disclosure of the above application is incorporated herein by reference in its entirety.

TECHNICAL FIELD

The present invention generally relates to a method for removing disturbances in an image captured by a fingerprint sensor, and specifically to reduction of noise in an acquired fingerprint image by incorporating the sensing principle into the applied method for noise reduction, wherein the noise reduced image is used for determining a representation of a fingerprint pattern. The invention also relates to a corresponding electronic device and to a computer program product.

BACKGROUND OF THE INVENTION

Various types of biometric systems are used more and more in order to provide for increased security for accessing an electronic device, thereby providing an enhanced user convenience. In particular fingerprint sensors have been successfully integrated in such devices, for example, thanks to their small form factor, high performance and user acceptance. Among the various available fingerprint sensing principles (such as capacitive, optical, thermal etc.), capacitive sensing is most commonly used, in particular in applications where size and power consumption are important issues.

All capacitive fingerprint sensors provide a measure indicative of the capacitance between several sensing elements and a finger placed on the surface of the fingerprint sensor. Acquisition of a fingerprint image is typically performed using a fingerprint sensor comprising a plurality of sensing elements arranged in a two-dimensional manner, and a block based technique may be applied to the fingerprint sensor for acquiring a fingerprint image, where the blocks of sensing elements are sampled sequentially. As an example, a block of eight sensing elements adjacently arranged in one row may be sampled at the same time.

The presence of noise in the sensor introduces an error into the data values that are read when sampling each block of sensing elements. This error manifests as a potentially varying offset from a certain zero-offset reference, such as ground. Because the blocks of sensing elements are scanned sequentially and because the amount of noise in the sensor may vary over time, a different error may occur in each block of sensing elements.

This noise problem has traditionally been compensated by configuring the hardware of the fingerprint sensor. However, a software or firmware approach may be advantageous as the amount of compensation can be flexibly controlled. Additionally, the software or firmware approach does not consume additional silicon area or silicon development schedule, and is relatively computationally inexpensive.

An exemplary software implementation for noise reduction is disclosed in US 2014/0015774 A1, where the acquired sensor data is adjusted in order to compensate for noise introduced by the fingerprint sensor. According to US 2014/0015774 A1, a redundant sensing element is introduced in regards to the block based sampling of the fingerprint sensor, where the same redundant sensing element will be sampled by each one of two sequentially sampled blocks. An offset is calculated based on a difference between the redundant sampling of the same sampling element, and the second block is adjusted based on the calculated difference.

Even though US 2014/0015774 A1 introduces an interesting approach to noise reduction when applying a block based sensing technique, the disclosed approach will largely rely on firstly acquired sample on each row and thus the overall result will be largely dependent on the validity of this first sample. Thus, there appears to be room for further improvement in regards to software based noise mitigation technique to be applied to a fingerprint image.

SUMMARY OF THE INVENTION

In view of above-mentioned and other drawbacks of the prior art, it is an object of the present invention to provide an improved method for handling of noise in a fingerprint image captured using a fingerprint sensor. In particular, the present inventors have found that the selection of an optimized sampling pattern is desirable, where knowledge as to the selected sampling pattern is included in further processing of the acquired fingerprint image.

According to an aspect of the present invention, it is therefore provided a method of determining a representation of a fingerprint pattern of a finger captured using a fingerprint sensor comprising a plurality of sensing elements, the method comprising the steps of selecting a sampling matrix, wherein the sampling matrix represents a sampling pattern for acquiring a fingerprint image using the fingerprint sensor, acquiring the fingerprint image using the fingerprint sensor and according to the sampling matrix, applying a linear filter to the acquired fingerprint image, wherein setup of the linear filter depends on the sampling matrix and the linear filter is provided for noise reduction within the acquired fingerprint image, and determining the representation of said fingerprint pattern based on said filtered fingerprint image.

The present invention is based upon the realization that a typical implementation of a system comprising a fingerprint sensor only allows a selected portion of the total sensor to be sampled at a single time. The typical acquisition of a fingerprint image using a fingerprint sensor comprises consecutively acquiring portions of the fingerprint image and combining these portions into one fingerprint image. As a consequence of such a sequential acquisition scheme, time variant or random noise possibly being present at the time of acquiring each of the portions of the fingerprint image may be somewhat different for each of the portions of the fingerprint image. Thus, artifacts may be introduced in the image.

However, in accordance to the present invention a computer implemented method may be applied for post processing of the fingerprint image, where the sampling strategy used for acquiring the fingerprint image is taken into account. Specifically, in accordance to the invention a linear filter will be applied to the fingerprint image, where the linear filter is setup in such a way that it takes into account the sampling strategy. The sampling strategy is in accordance to the invention realized as a sampling matrix which representing a sampling pattern for acquiring a fingerprint image using the fingerprint sensor.

Accordingly, advantages with the invention include an improved formation of a fingerprint image and thus the possibility of better performance in regards to the determination of a fingerprint pattern to be used in a system typically comprising the fingerprint sensor. This is specifically achieved as the filtering scheme according to the invention closely relies on how in fact the fingerprint image has been acquired. In addition, as the method is a computer implemented post processing scheme, there is no necessity of adjusting the hardware of the fingerprint sensor, a common prior art approach for noise mitigation. Rather, the inventive method may be inserted as a component in a typical flow for acquiring a fingerprint image. The inventive method will typically be able to handle any type of noise, being specifically useful in relation to common mode noise (CMN) as will be further elaborated below.

Even though the inventive method typically is implemented as code executed by a processor controlling the fingerprint sensor or arranged separately with a system in which the fingerprint sensor forms an element, the inventive concept may alternatively (or partly) be implemented as functional blocks of for example an ASIC or similar. Any combination of such implementations are possible and within the scope of the invention.

Typically, the sampling matrix will have a structure being based on the spatial implementation of the fingerprint sensor. The exact structure of the sampling matrix and the optimized selection of the sampling matrix will be further discussed below.

In a possible alternative embodiment of the invention, the fingerprint sensor is a two-dimensional fingerprint sensor and the sampling matrix corresponds to a selected portion of the plurality of sensing elements. The fingerprint sensor may, as indicated above, be implemented using any kind of currently or future fingerprint sensing principles, including for example capacitive, optical, or thermal sensing technology. However, at present capacitive sensing is most preferred. In addition, also one-dimensional sensors are possible and within the scope of the invention.

Similarly, it may according to the invention be possible to apply the inventive method in relation to multi-capturing of fingerprint images, where a plurality of images are combined for further enhancing the possibility of determining a fingerprint pattern. Accordingly, the filtering scheme proposed by the inventive method will in addition to the sampling pattern used in acquiring a single fingerprint image also cater for subsequent sampling of a plurality of fingerprint images.

In a possible embodiment of the invention and in relation to multi-capturing of fingerprint images, the sampling matrix may be changed for subsequently captured fingerprint image. By changing which pixels that are sampled at the same time in subsequently captured fingerprint image will give overlapping information that could be used in line with the inventive filtering scheme.

The sampling matrix may for example define a selected portion of the plurality of sensing elements as an adjacently arranged group of sensing elements. Alternatively, the selected portion of the plurality of sensing elements may be spatially separated over the two-dimensional sensor. By spreading out the sampled pixels will give similar result as sampling more pixels at the same time. If a large enough area is covered by sampled pixels it is easy to remove the disturbance from the finger print image since the average pixel sum should be more or less constant.

In a preferred embodiment of the invention, the sampling matrix is selected to correspond to a minimized amount of noise within an acquired fingerprint image. The selection of the sampling matrix may be made in an iterative manner, where an amount of perceived noise within the acquired fingerprint image is reduced to a minimum. The selection may alternatively be computed based on predetermined assumptions in relation to the structure of the fingerprint sensor. This will be further elaborated in relation to the detailed description of the invention.

Preferably, the method further comprises the steps of determining a log-likelihood ratio for noise being present within the fingerprint image, comparing the log-likelihood ratio with a predetermined threshold, and performing filtering of the fingerprint image only if the log-likelihood ratio is above the predetermined threshold. By introducing a scheme for determining if noise likely is present within the image it may be possible to further improve the acquisition of a proper fingerprint image and thus the determination of a fingerprint pattern. In a possible implementation of the invention, it may be possible to "bluntly" introduce the above additional steps before performing any filtering, i.e. in case the likelihood of noise is lower than the predetermined threshold the filtering scheme as discussed above will not be performed. However, it may as an alternative be possible to use the concept of noise likelihood determination "on its own" for reacquiring a fingerprint image if the noise level is determined to be higher than a desired level. It should be noted that the log-likelihood ratio in regards to a two-dimensional fingerprint sensor comprising a plurality of rows may be computed e.g. row-by-row and then filtered (e.g. averaged) over several rows (e.g. using a sliding window averaging filter).

In a possible alternative embodiment of the invention, the step of determining a log-likelihood ratio comprises evaluating a likelihood function for the assumption that noise is not present, and evaluating the likelihood function for the assumption that noise is present in accordance with the sampling matrix. This implementation may have additional advantages as the sampling matrix is also taken into account in the case of assuming that noise is not present. However, such an implementation is provided as an alternative to the case where the sampling matrix is only taken into account in regards to the assumption that noise is present.

In a preferred embodiment of the invention, the method further comprises the step of applying a non-linear mapping function to the acquired fingerprint image, where the non-linear mapping function for example may be a logarithmic function. Applying a non-linear mapping function to the acquired fingerprint image have the advantage that it make the multiplicative effects additive.

According to another aspect of the present invention, there is provided a portable electronic device, comprising a portable electronic device, comprising a fingerprint sensor having an array of pixels, and a control unit electrically connected to the fingerprint sensor, wherein the control unit is configured for selecting a sampling matrix, wherein the sampling matrix represents a sampling pattern for acquiring a fingerprint image using the fingerprint sensor, applying a linear filter to the acquired fingerprint image, wherein setup of the linear filter depends on the sampling matrix and the linear filter is provided for noise reduction within the acquired fingerprint image, and determining a representation of a fingerprint pattern based on said filtered fingerprint image.

This aspect of the invention provides similar advantages as discussed above in relation to the previous aspect of the invention. In addition, the invention provides for an improved reliability of the electronic device, for example in use cases where noise, such as common-mode noise (CMN) may readily be introduced. As mentioned above, such a scenario may for example be when the electronic device is connected to a switch mode power supply.

According to the invention, the control unit is preferably an ASIC, a micro processor or any other type of computing device for controlling the operation of the fingerprint sensor. As such, the control unit may form an integral part of the second user input device. However, the control unit may also be a general control unit comprised with the portable electronic device, for example configured for controlling the overall operation of the electronic device.

The fingerprint sensor may, as indicated above, be implemented using any kind of currently or future fingerprint sensing principles, including for example capacitive, optical, or thermal sensing technology. However, at present capacitive sensing is most preferred.

As discussed above, any type of fingerprint sensor may be employed, i.e. both one and two-dimensional fingerprint sensors. In a possible implementation of the invention, the fingerprint sensor comprises at least 160×160 pixels, more preferably 192×192 pixels, and most preferably 208×80 pixels. Further resolutions are possible and within the scope of the invention. The portable electronic device may for example be a mobile phone or a tablet.

The filtering may be carried out on analog or digital signals, and may be performed on the fingerprint sensor component or outside the fingerprint sensor component, such as in a host processor in a mobile phone or computer etc.

According to a further aspect of the present invention, there is provided a computer program product comprising a computer readable medium having stored thereon computer program means for a control unit adapted for controlling a portable electronic device, the portable electronic device comprising a fingerprint sensor and a control unit, wherein the computer program product comprises code for selecting a sampling matrix, wherein the sampling matrix represents a sampling pattern for acquiring a fingerprint image using the fingerprint sensor, code for acquiring the fingerprint image using the fingerprint sensor and according to the sampling matrix, code for applying a linear filter to the acquired fingerprint image, wherein setup of the linear filter depends on the sampling matrix and the linear filter is provided for noise reduction within the acquired fingerprint image, and code for determining a representation of a fingerprint pattern based on said filtered fingerprint image. Also this aspect of the invention provides similar advantages as discussed above in relation to the previous aspects of the invention.

As mentioned above, the control unit is preferably an ASIC, a micro processor or any other type of computing device. Similarly, a software executed by the control unit for operating the inventive system may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art.

In summary, the present invention generally relates to a method for removing disturbances in an image captured by a fingerprint sensor, and specifically to reduction of noise in an acquired fingerprint image by incorporating the sensing principle into the applied method for noise reduction, wherein the noise reduced image is used for determining a representation of a fingerprint pattern. Advantages with the invention include enhanced determination of fingerprint patterns from fingerprint images captured using a fingerprint sensor.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which:

FIG. 6A-B is a flowchart disclosing the exemplary steps of the invention according to a currently preferred embodiment of the invention; and FIGS. 7A-7E provides a functional illustration of the flowchart shown in FIGS. 6A-B;

DETAILED DESCRIPTION

Figure 1:
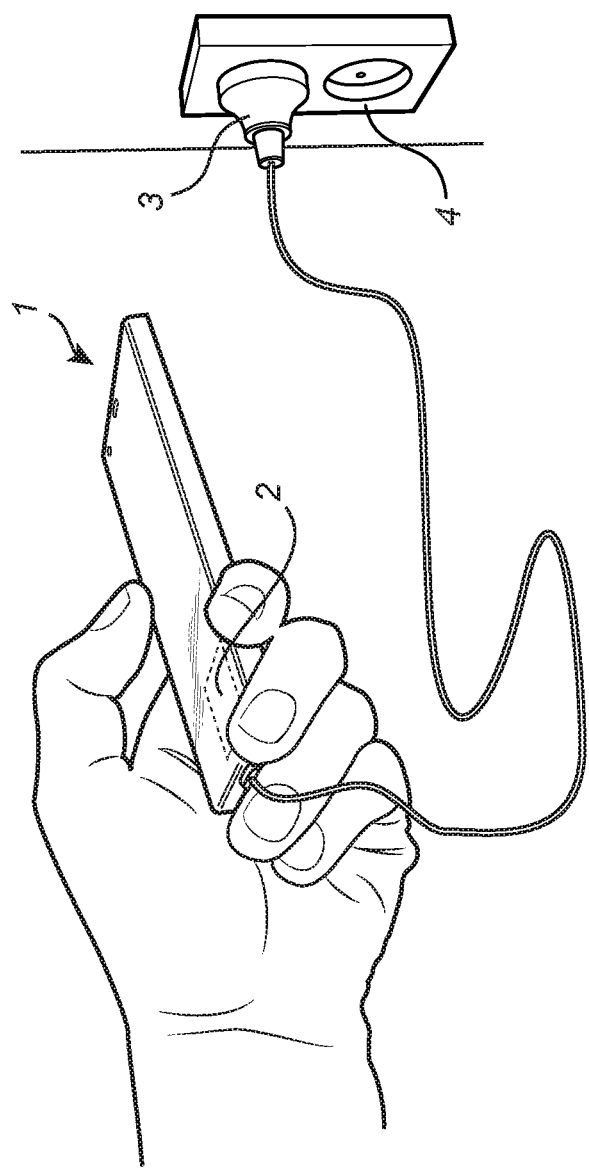
FIG. 1 schematically illustrates an application for a fingerprint sensing system according to an example embodiment of the present invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout.

Turning now to the drawings and to FIG. 1 in particular, there is schematically illustrated an example application for a fingerprint sensing system according to embodiments of the present invention, in the form of a mobile phone 1 with an integrated fingerprint sensing system 2. The fingerprint sensing system 2 may, for example, be used for unlocking the mobile phone 1 and/or for authorizing transactions carried out using the mobile phone etc.

As is shown in FIG. 1, the mobile phone 1 is being charged using a charger 3 connected to an AC power socket 4. The charging of the phone may introduce common-mode noise that makes the mobile phone 1 follow the electric potential of the common-mode noise—the mobile phone 1 will "bounce up and down" electrically.

The common-mode noise will, from the perspective of the mobile phone 1, cause the user to appear electrically noisy. This may influence uses of the mobile phone 1 that rely upon an evaluation of the potential difference between the mobile phone 1 and the user. Such uses include, for example, use of a capacitive touchscreen and use of the fingerprint sensing system 2.

Preferably and as is apparent for the skilled person, the mobile phone 1 shown in FIG. 1 may further comprises a first antenna for WLAN/Wi-Fi communication, a second antenna for telecommunication communication, a micro-phone, a speaker, and a phone control unit. Further hardware elements are of course possibly comprised with the mobile phone. It should furthermore be noted that the invention may be applicable in relation to any other type of portable electronic device, such as a laptop, a remote control, a tablet computer, or any other type of present or future similarly configured device.

Figure 2:
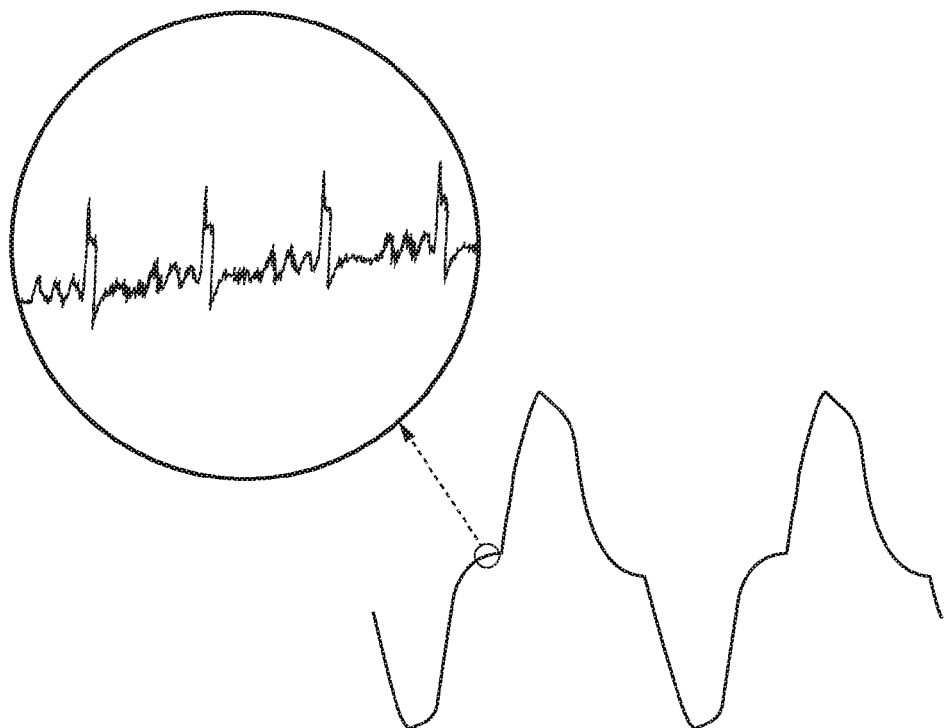
FIG. 2 is a representative illustration of common-mode noise from a switched power supply.

FIG. 2 is a representative illustration of the common-mode noise from the charger 3 in FIG. 1. As can be seen in FIG. 2, the common-mode noise may have a low frequency component (50/60 Hz depending on the AC power frequency) with relatively high amplitude, and a high frequency switch mode component (the enlarged part of FIG. 2) with a lower amplitude. In particular the high frequency component of the common-mode noise can cause problems for a fingerprint sensing system. In the following, it will be described how various embodiments of the present invention at least partly mitigate such problems.

First, two embodiments of the fingerprint system according to the present invention—one touch sensor based system and one swipe sensor based system—will be described with reference to FIGS. 3A-B.

Figure 3A:
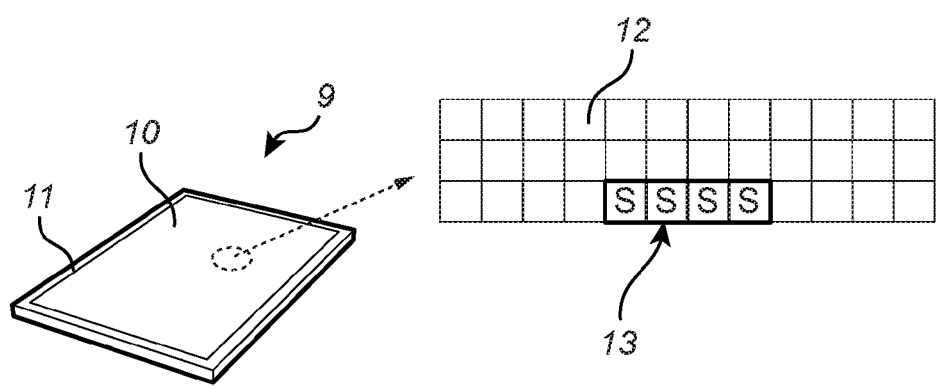
FIG. 3A schematically shows a first embodiment of the fingerprint sensing system according to the present invention.

FIG. 3A schematically shows a touch sensor based fingerprint sensing system, in the form of packaged touch sensor component 9 preferably comprising a two-dimensional sensor array 10 and for example a conductive bezel or frame 11 for providing an excitation signal to the finger of the user. Although not explicitly shown in FIG. 3A, the sensor component 9 also comprises a power supply interface and a communication interface.

The sensor array 10 comprises a large number of sensing elements, 12 (only one of the sensing elements has been indicated with a reference numeral to avoid cluttering the drawing), each being controllable to sense a distance between a sensing structure (top plate) comprised in the sensing element 12 and the surface of a finger contacting the top surface of the sensor array 10. In the enlarged portion of the sensor array 10 in FIG. 3A, a first group 13 of sensing elements are marked 'S' for sensing, where the first group of sensing elements are all sensed together at one time.

Figure 3B:
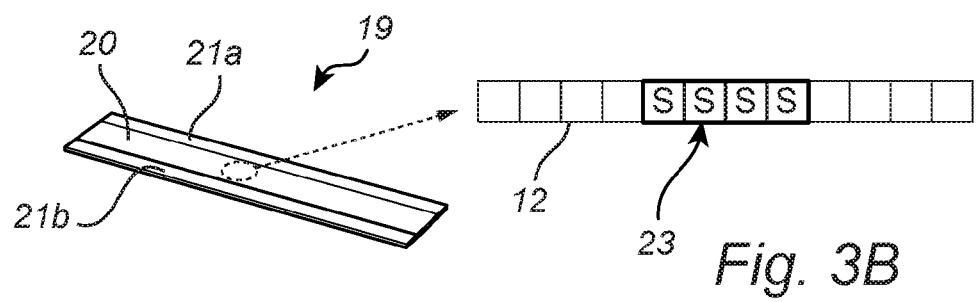
FIG. 3B schematically shows a second embodiment of the fingerprint sensing system according to the present invention.

FIG. 3B schematically shows a swipe sensor based fingerprint sensing system, in the form of packaged swipe sensor component 19 comprising a sensor array 20 and conductive strips 21a and 21b for providing an excitation signal to the finger of the user. Although not explicitly shown in FIG. 3B, the sensor component 19 also comprises a power supply interface and a communication interface.

The sensor array 20 comprises one or several lines of sensing elements, 12 (only one of the sensing elements has been indicated with a reference numeral to avoid cluttering the drawing), each being controllable to sense a distance between a sensing structure (top plate) comprised in the sensing element 12 and the surface of a finger contacting the top surface of the sensor array 20. In the enlarged portion of the sensor component 19 in FIG. 3B, a group 23 of sensing elements are marked 'S' for sensing, in a similar manner as in regards to FIG. 3A indicating a group based sensing strategy.

The fingerprint sensor components 9, 19 in FIGS. 3A-B may advantageously be manufactured using CMOS technology, but other techniques and processes may also be feasible. For instance, an insulating substrate may be used and/or thin-film technology may be utilized for some or all process steps of the manufacturing process.

Figure 4:
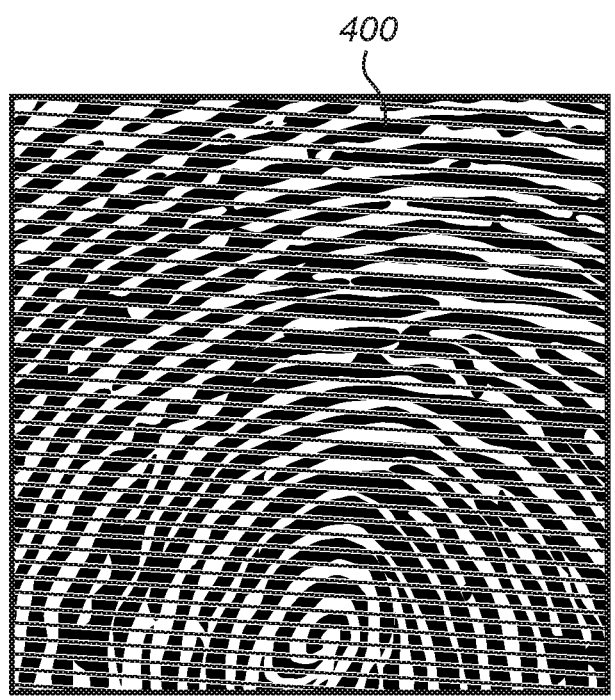
FIG. 4 illustrates a noisy fingerprint image.
Figure 5A:
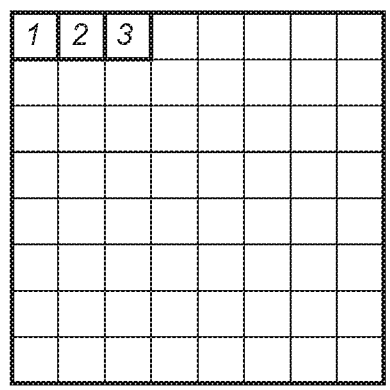
FIG. 5A-5E illustrates different sampling configurations.
Figure 5B:
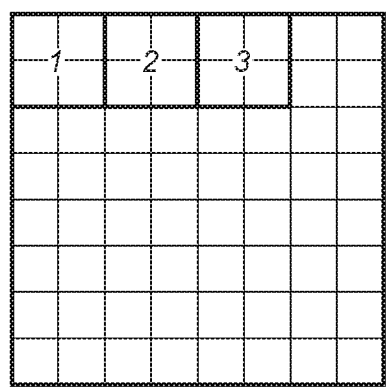
Figure 5C:
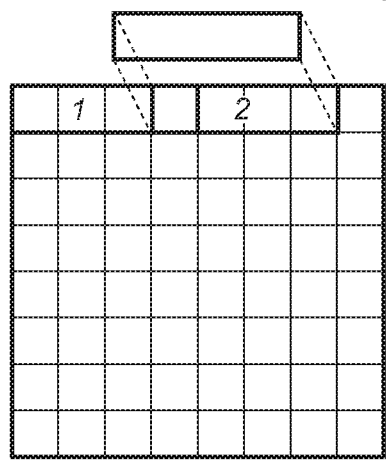
Figure 5D:
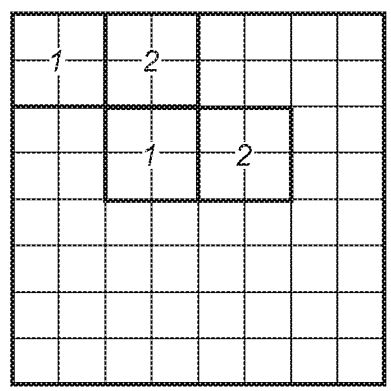
Figure 5E:
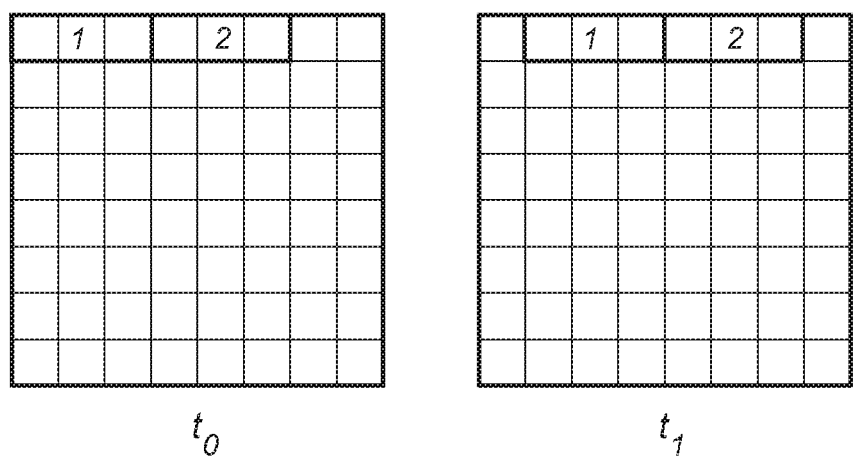

Turning now to FIG. 4 which illustrates a noisy fingerprint image 400 captured using a fingerprint sensor applying a capacitive measurement principle. As mentioned above, one type of noise that can occur is that of CMN, which is noise injected onto both the desired signal and the reference signal against which the desired signal is measured. If an ideal differential measurement of the desired signal is carried out against the reference signal, the CMN will therefore perfectly cancel out and hence not degrade the measurement of the desired signal. In practice it can however be very challenging to achieve good rejection of CMN due to e.g. imperfect cancellation and parasitic capacitances to other signals not impacted by the same CMN. One example is that of capacitances to earth ground, which does not follow the CMN signal and therefore directly exposes the absolute CMN level.

As discussed above, this is especially a problem in systems utilizing a capacitive measurement principle, e.g. for fingerprint sensors or capacitive touch screens. Furthermore, the signal level of CMN coming from e.g. certain switch-mode power supplies in chargers may be very large, e.g. 40V peak-to-peak, as compared to the drive voltage supplied to the bezel in e.g. a fingerprint sensing system. As a result, the large signal level of the CMN can therefore be a dominating interference in the resulting fingerprint image.

Due to the way that the CMN affects the measurements, the noise can typically be modeled as being multiplicative, i.e. the amount of CMN scales with the value of the fingerprint. It should be emphasized that the method according to the present invention also support other type's noise couplings, e.g. additive noise, and that a non-linear mapping function may be applied to the input signal, e.g. a logarithm function to make the multiplicative effects additive.

When compared to the existing solutions, a major advantage of the method according to the present invention is that it guides the configuration of the sensing principle utilized in order to improve the CMN mitigation and then afterwards is capable of incorporating this knowledge into the CMN detection, estimation and rejection.

In a possible implementation of the invention, a three step process is provided, including 1) setting up the sampling to improve mitigation of CMN, 2) detecting if CMN is present, and if so, 3) provides a means for rejecting it by filtering.

Since the detection relies on similar techniques as the filtering, the filtering will be first described followed by the noise detection. The filtering typically consists of either a 1- or 2-dimensional Linear Minimum Mean Square Error (LMMSE) estimate of the CMN followed, either explicitly or implicitly, by cancellation of the CMN estimate from the input.

The CMN estimate has been derived such that it takes the characteristic of the sampling process and the noise into account while it at the same time exploits the structure of signal of interest. This has the advantage that the impact of the sampling process can be assessed and optimized in order to provide the best rejection of the noise. In the example of a fingerprint sensor system, the signal of interest would be the image of the fingerprint. The same structures used for LMMSE filtering are reused in the Generalized Likelihood Ratio Testing (GLRT) described subsequently.

Since the CMN may be assumed to be constant over the spatial sampling dimension, i.e. between pixels in the image, the sampling procedure is an important factor in order to separate the desired (fingerprint) signal from that of the CMN. The sampling procedure both spatially and temporally is therefore key to achieving good mitigation of the noise. Examples of such spatio-temporal sampling configurations, which may be combined as desired, are, with further reference to FIGS. 5A-5E:

Individual sampling where all samples are collected independently, see FIG. 5 A, Block sampling where a localized spatial area is sampled at the same time, see FIG. 5 B, Overlapped sampling where overlapping blocks of spatial samples are sampled one block at a time, see FIG. 5 C, Parallel sampling where non-overlapping spatial blocks are sampled independently. The blocks could for example be distributed spatially, see FIG. 5 D, and Time-varying spatial sampling procedures, see FIG. 5 E.

The detailed mathematical description providing the link between the sampling procedure used and the filtering follows below. Throughout this description bold lowercase letters (e.g. x) denote column vectors, while bold uppercase letters denote matrices (e.g. X). The matrix transpose is denoted $(\bullet)^T$, and $X_{i,j:k}$ is a vector containing elements [(i,j), (i,j+1), . . . , (i,k)] in X. The identity matrix is denoted I and 0 or 1 are vectors (or matrices) where all the elements have the value 0 or 1. The matrix trace is indicated by tr{•} and $\mathbb{R}$ denotes the real valued domain.

In determining the sampling to improve mitigation of CMN, let $\tilde{Y} \in \mathbb{R}^{M \times N}$ denote the image captured by sensing system where M is the number of rows and N is the number of columns in the image. The mean value of the image $$\mu_y = \frac{1}{MN} \sum_{i=1}^{MN} \tilde{y}_i \qquad \text{(Equation 1)}$$

can be subtracted from the captured image to get an image $Y_{i,j} = \tilde{Y}_{i,j} - \mu_y$ with zero mean. Since such a mapping is always feasible, Y will be the image of interest in the derivation below. The "vectorized" version of the matrix Y is given as $y \triangleq \text{vec}(Y) = [Y_{1,1:N}, Y_{2,1:N}, \ldots, Y_{M,1:N}]^T$ which implies that the transpose of all row-vectors in Y are stacked on top of each other row-by-row. This implies that $y \in \mathbb{R}^{MN}$ and the system can be described by the following linear model $$y = Sc + f \qquad \text{(Equation 2)}$$

where $$S \in \mathbb{R}^{MN \times \frac{MN}{B}}$$

is a spatial sampling matrix describing how the CMN vector, $$c \in \mathbb{R}^{\frac{MN}{B}},$$

impacts the image Y where B is the spatial sampling block-size. The spatial sampling block-size hence specifies how many desired (fingerprint) samples are acquired at the same time and thus sharing the same realization of the CMN. The vector $f \in \mathbb{R}^{MN}$ denotes the desired (fingerprint) signal as well as any additional noise present. It is well known that the LMMSE estimate of the linear model in equation 2 can be computed as $$\hat{c}_{LMMSE} = (S^T \Sigma_f^{-1} S + \Sigma_c^{-1})^{-1} S^T \Sigma_f^{-1} y = \Sigma_c S^T (S \Sigma_c S^T + \Sigma_f)^{-1} y \qquad \text{(Equation 3)}$$

where $\Sigma_f$ denotes the spatial covariance matrix of the fingerprint and $\Sigma_c$ is the covariance matrix of the CMN samples, both assumed to be zero-mean. If multiple samples in time are performed, the model can directly be extended to also cover this aspect by setting up S to be the spatio-temporal sampling matrix and covariance matrices $\Sigma_f$ and $\Sigma_c$ to be the spatio-temporal covariance matrices of the fingerprint and CMN respectively and thereby producing a total number of samples exceeding MN. Such spatio-temporal filtering may be beneficial if the fingerprint changes only slightly between images.

Also of interest in determining a good sampling procedure is the posterior covariance matrix $P_{\hat{c}}$ of the estimate $\hat{c}_{LMMSE}$ given as $$P_{\hat{c}} = (S^T \Sigma_f^{-1} S + \Sigma_c^{-1})^{-1} = (I - \Sigma_c S^T (S \Sigma_c S^T + \Sigma_f)^{-1} S) \Sigma_c \qquad \text{(Equation 4)}$$

Ideally there is no error in the CMN estimate, i.e. $P_{\hat{c}} = 0$, but this is in general not possible. The sampling procedure that determine S is therefore very important for the ability to reject the CMN as well as possible and the design/choice of how to sample is therefore a very important aspect of this. Under the ideal assumption that $\Sigma_c$ and $\Sigma_f$ are perfectly known a-priori, choosing the sampling such as to minimize the posterior error given by tr{$P_{\hat{c}}$} is a reasonable choice, but other optimization targets may also be used. As the sampling block-size and associated constraints of the HW also play a role in this optimization, this is a non-trivial design problem where an optimization measure such as tr{$P_{\hat{c}}$} may be used for guidance.

As an example of this guidance, the special case of sampling a full image at the same time, i.e. S=1 is a vector of all ones, while assuming that $\Sigma_f$ does not span this sampling space directly yields $P_{\hat{c}} = 0$ since $1^T(11^T + \Sigma_f)^{-1} 1 = 1$. This special case showing perfect estimation, and hence subsequent cancellation, of the CMN is achievable by having a specific sampling design which is optimized to exploit the assumed covariance structure of the fingerprint and may be highly challenging to implement in practice. However, the general principle is to optimize the sampling procedure in order to provide the best CMN estimate for subsequent cancellation by exploiting prior covariance knowledge of the fingerprint and the CMN.

The general LMMSE filter described here can be used for estimating the CMN, but the complexity of this implementation will typically be large, and one possible approximation to this full solution can be obtained by utilizing a Kronecker structure over e.g. the horizontal and/or vertical dimensions. If the desired signal and the CMN can be assumed to only correlate locally, a (block) sliding-window approximation to the LMMSE filter may also be used either alone or together with the Kronecker structure to ease implementation.

Let the CMN vector be given by $c \sim \mathcal{N}(0, P_c I)$, where $P_c$ denotes the power of the CMN driving signal and $\mathcal{N}$ denotes the normal distribution. This implies that the LMMSE solution in equation 3 is $$\hat{c}_{LMMSE} = (S^T P_f^{-1} (\Sigma_{f,y}^{-1} \otimes \Sigma_{f,x}^{-1}) S + P_c^{-1} I)^{-1} S^T P_f^{-1} (\Sigma_{f,y}^{-1} \otimes \Sigma_{f,x}^{-1}) y \qquad \text{(Equation 5)}$$

where it has also been assumed that the fingerprint vector is given by $f \sim \mathcal{N}(0, P_f(\Sigma_{f,y} \otimes \Sigma_{f,x}))$. In equation 5, $P_f$ represents the power of the signal from the fingerprint while $\Sigma_{f,y}$ denotes the covariance in the vertical direction of the fingerprint and $\Sigma_{f,x}$ is the covariance in the horizontal direction. If the CMN impact on the image Y can be expressed by $S = S_y \otimes S_x$, equation 5 becomes $$\hat{c}_{LMMSE} = ((S_y^T \otimes S_x^T) P_f^{-1} (\Sigma_{f,y}^{-1} \otimes \Sigma_{f,x}^{-1})(S_y \otimes S_x) + P_c^{-1} I)^{-1} (S_y^T \otimes S_x^T) P_f^{-1} (\Sigma_{f,y}^{-1} \otimes \Sigma_{f,x}^{-1}) y \qquad \text{(Equation 6)}$$

which implies that the overall CMN will be constrained to have noise components in the vertical and horizontal directions represented by $S_y$ and $S_x$ respectively.

The sensor system can be designed such that the image Y is constructed by sampling several pixels simultaneously and this can be incorporated in the structure of S.

Examples of different capturing methods are listed here

Horizontal sampling where $B=L_x$ pixels in the rows of Y have been captured at the same time leads to $S=I_y\otimes(I_x\otimes 1)$.

Vertical sampling where $B=L_y$ pixels in the columns of Y have been captured at the same time leads to $S=(I_y\otimes 1)\otimes I_x$.

Localized 2D sampling where a local block of $B=L_y\times L_x$ of pixels in the image have been captured at the same time leads to $S=(I_y\otimes 1)\otimes(I_x\otimes 1)$.

General 2D sampling where a number of B of pixels in the image have been captured at the same time as indicated by the general matrix S.

where the size of vector 1 is given by the number of pixels that are captured at the same time. Inserting the special cases of S shown above in equation 6 yields solutions exploiting the sampling structure. Based on the type of CMN expected and the HW constraints regarding the achievable sampling structure, a suitable sampling structure and the associated S matrix may then be chosen based on an optimization criteria such as e.g. given by equation 4. As an example indicating how the sampling structure can be exploited when setting up the filter, the case of horizontal sampling gives $$\hat{c}_{LMMSE} = \qquad\text{(Equation 7)}$$
$$\left((I_y\otimes(I_x\otimes 1^T))(\Sigma_{f,y}^{-1}\otimes\Sigma_{f,x}^{-1})(I_y\otimes(I_x\otimes 1)) + \frac{P_f}{P_c}(I_y\otimes I_x)\right)^{-1}$$
$$(I_y\otimes(I_x\otimes 1^T))(\Sigma_{f,y}^{-1}\otimes\Sigma_{f,x}^{-1})y$$

This expression can be rewritten to $$\hat{c}_{LMMSE} = \left(\Sigma_{f,y}^{-1}\otimes(I_x\otimes 1^T)\Sigma_{f,x}^{-1}(I_x\otimes 1) + \frac{P_f}{P_c}(I_y\otimes I_x)\right)^{-1}\qquad\text{(Equation 8)}$$
$$(\Sigma_{f,y}^{-1}\otimes(I_x\otimes 1^T)\Sigma_{f,x}^{-1})y$$

By defining $$\tilde{S}_x \triangleq \Sigma_{f,x}^{-\frac{1}{2}}S_x,$$

which for the horizontal sampling implies that $$\tilde{S}_x = \Sigma_{f,x}^{-\frac{1}{2}}(I_x\otimes 1) \text{ and } \tilde{y}\triangleq\left(I_y\otimes\Sigma_{f,x}^{-\frac{1}{2}}\right)y,$$

the expression in equation 8 it can be simplified to $$\hat{c}_{LMMSE} = \left(\Sigma_{f,y}^{-1}\otimes(\tilde{S}_x^T\tilde{S}_x) + \frac{P_f}{P_c}I\right)^{-1}(\Sigma_{f,y}^{-1}\otimes\tilde{S}_x^T)\tilde{y}\qquad\text{(Equation 9)}$$

By performing a singular value decomposition (SVD) of $\tilde{S}_x=U_xD_xV_x^T$ and an eigenvalue decomposition of the covariance matrix $\Sigma_{f,y}^{-1}=V_{f,y}D_{f,y}^{-1}V_{f,y}^T$, the expression in equation 9 becomes $$\hat{c}_{LMMSE} = \left((V_{f,y}D_{f,y}^{-1}V_{f,y}^T)\otimes(V_xD_x^TD_xV_x^T) + \frac{P_f}{P_c}I\right)^{-1}\qquad\text{(Equation 10)}$$
$$((V_{f,y}D_{f,y}^{-1}V_{f,y}^T)\otimes(V_xD_x^TU_x^T))\tilde{y} = (V_{f,y}\otimes V_x)$$
$$\left(D_{f,y}^{-1}\otimes D_x^TD_x + \frac{P_f}{P_c}I\right)^{-1}(D_{f,y}^{-1}\otimes D_x^T)(V_{f,y}\otimes U_x)^T\tilde{y}$$

Due to the Kronecker structure present in equation 10, this can be implemented efficiently by utilizing the separation between the horizontal and vertical spatial dimensions. The special case of one-dimensional processing in either the horizontal or vertical direction are special cases of the expressions above where $S_x$ and $\Sigma_{f,x}$ or $S_y$ and $\Sigma_{f,y}$ are diagonal matrices respectively.

In the general LMMSE expression of equation 3, the covariance matrix $\Sigma_c$ represents the prior information about the common-mode noise. In the Kronecker structured expressions above, so far $\Sigma_c$ has been considered to be a scaled identity matrix as this simplifies the expression and leads to a lower complexity in implementation. However, a-priori knowledge concerning the CMN may be available and this can then be incorporated into $\Sigma_c$ for improved estimation accuracy. However when the Kronecker structure is utilized for an efficient implementation, this Kronecker structure will only be possible to directly exploit if the log-likelihood term $S^T\Sigma_f^{-1}S$ and prior $\Sigma_c$ share a common basis. This may be hard to achieve and can make it difficult to efficiently incorporate prior information about the CMN.

A possible solution to this problem is to approximate the prior using the basis from the log-likelihood term or vice versa. An example of this is to constrain the prior to be of the form $\Sigma_c=(V_y\otimes V_x)(D_y\otimes D_x)(V_y\otimes V_x)^T$ where $V_x$ and $V_y$ are the horizontal and vertical bases respectively and $D_x$ and $D_y$ are the associated spectra approximating the a-priori information for the CMN. The bases used could then be extracted from the log-likelihood term $S^T\Sigma_f^{-1}S$ or a common basis could be enforced for both the log-likelihood and prior terms, e.g. the fixed DCT basis.

Turning now to the concept of the implementation of a Generalized Likelihood Ratio Test (GLRT), which can be conducted by examining if the multivariate distribution of the data is more likely to contain CMN or not. This can be achieved by evaluating the likelihood of the hypothesis of CMN versus the counter-hypothesis of no CMN. Given that the hypothesis can be modeled as zero-mean multivariate normal distributions, this results in $H_{cmn}: y\sim\mathcal{N}(0,P_{f+c}\Sigma_{f+c})$ where $P_{f+c}\Sigma_{f+c}$ is the total signal covariance matrix of the fingerprint and CMN with $P_{f+c}$ being a generally unknown power level. Similarly for the counter-hypothesis of no CMN, this results in $H_{no-cmn}: y\sim\mathcal{N}(0,P_f\Sigma_f)$ where $P_f\Sigma_f$ is the total signal covariance matrix of the fingerprint with $P_f$ being a generally unknown power level. Given the multivariate Gaussian likelihood functions, the GLRT can be written as $$LLR = \ln\left(\frac{\max_{P_{f+c}}|2\pi P_{f+c}\Sigma_{f+c}|^{-\frac{1}{2}}\exp\left(-\frac{1}{2P_{f+c}}y^T\Sigma_{f+c}^{-1}y\right)}{\max_{P_f}|2\pi P_f\Sigma_f|^{-\frac{1}{2}}\exp\left(-\frac{1}{2P_f}y^T\Sigma_f^{-1}y\right)}\right)\qquad\text{(Equation 11)}$$
$$= \ln\left(\frac{\left|\frac{2\pi}{MN}y^T\Sigma_{f+c}^{-1}y\Sigma_{f+c}\right|^{-\frac{1}{2}}\exp\left(-\frac{MN}{2}\right)}{\left|\frac{2\pi}{MN}y^T\Sigma_f^{-1}y\Sigma_f\right|^{-\frac{1}{2}}\exp\left(-\frac{MN}{2}\right)}\right)$$

-continued $$= -\frac{1}{2}\ln\left(\frac{|y^T\Sigma_{f+c}^{-1}y\Sigma_{f+c}|}{|y^T\Sigma_f^{-1}y\Sigma_f|}\right)$$

$$= -\frac{MN}{2}\ln\left(\frac{y^T\Sigma_{f+c}^{-1}y}{y^T\Sigma_f^{-1}y}\right) - \frac{1}{2}\ln\left(\frac{|\Sigma_{f+c}|}{|\Sigma_f|}\right)$$

where CMN being present will be declared if the log-likelihood ratio score LLR exceeds a given threshold.

By assuming that the fingerprint and CMN are additive and independent leading to $\Sigma_{f+c}=\Sigma_f+S\Sigma_c S^T$, the implementation complexity of equation 11 can be reduced by using the matrix inversion lemma $\Sigma_{f+c}^{-1}=C_f C_f^T - C_f C_{f+c} C_{f+c}^T C_f^T$ where the Cholesky factors are defined as $$C_f C_f^T \triangleq \Sigma_f^{-1}$$

$$C_{f+c} C_{f+c}^T \stackrel{\triangle}{=} C_f^T S(\Sigma_c^{-1} + S^T\Sigma_f^{-1}S)^{-1} S^T C_f \qquad \text{(Equation 12)}$$

This allows rewriting of equation 11 as:

(Equation 13)

$$LLR = -\frac{MN}{2}\ln\left(\frac{y^T(C_f C_f^T - C_f C_{f+c} C_f^T C_f^T)y}{y^T C_f C_f^T y}\right) - \frac{1}{2}\ln\left(\frac{|\Sigma_{f+c}|}{|\Sigma_f|}\right)$$

$$= -\frac{MN}{2}\ln\left(1 - \frac{\|C_{f+c}^T C_f^T y\|^2}{\|C_f^T y\|^2}\right) - \frac{1}{2}\ln\left(\frac{|\Sigma_{f+c}|}{|\Sigma_f|}\right)$$

An alternative approach for computing an LLR for CMN detection is to directly evaluate the log-likelihood ratio using normalized covariance matrices as $$LLR = -\frac{1}{2}y^T Q_{f+c}^{-1}y - \frac{1}{2}y^T Q_f^{-1}y - \frac{1}{2}\ln\left(\frac{|Q_{f+c}|}{|Q_f|}\right) \qquad \text{(Equation 14)}$$

$$= -\frac{1}{2}y^T \underbrace{(Q_{f+c}^{-1} - Q_f^{-1})}_{F} y - \frac{1}{2}\ln\left(\frac{|Q_{f+c}|}{|Q_f|}\right)$$

where $$Q_{f+c} \triangleq \frac{MN}{tr\{\Sigma_{f+c}\}}\Sigma_{f+c} \text{ and } Q_f \triangleq \frac{MN}{tr\{\Sigma_f\}}\Sigma_f.$$

The matrices needed to compute the chosen LLR may be either precomputed offline and put into a filter bank or may be computed online in response to updated estimates of $\Sigma_{f+c}$ and $\Sigma_f$. If desired, a low-rank approximation of the matrix F in the alternative approach may be utilized to ease implementation.

In one embodiment of the invention where the sampling is done in either the horizontal (or vertical) direction, one option is to perform a 1D LMMSE estimate and GLRT of the CMN by processing each row (or column) independently. The advantage of such a process is that this will lower the computational complexity of the LMMSE estimation.

For horizontal sampling each row of the image, Y, is picked out, which implies that $y=Y_{i,1:N}$ for $i=[1, \ldots, M]$, which implies that the vector y is now only N-dimensional.

Likewise, for vertical sampling each column of the image is picked out, which implies that $y=Y_{1:M,j}$ where $j=[1, \ldots, N]$, which implies that the vector y is now only M-dimensional.

In such a 1D setup the Generalized Likelihood Ratio Testing (GLRT) can be performed row-by-row (or column-by-column) which implies that M log-likelihood values for the horizontal sampling (or N values for vertical sampling) can be computed for the entire image.

It may also be feasible to compute a log-likelihood value (i.e. perform GLRT) for each row (or column) and these can then be used for CMN detection. In one embodiment of the invention the GLRT outputs one log-likelihood value per row (or column) and these values can be filtered/averaged over several rows (or columns) before they are compared against a threshold value which is used for CMN detection. Furthermore, the filtering of log-likelihood values may also be done by performing a sliding window averaging and the output of this can be compared against a threshold value.

Figure 6B:
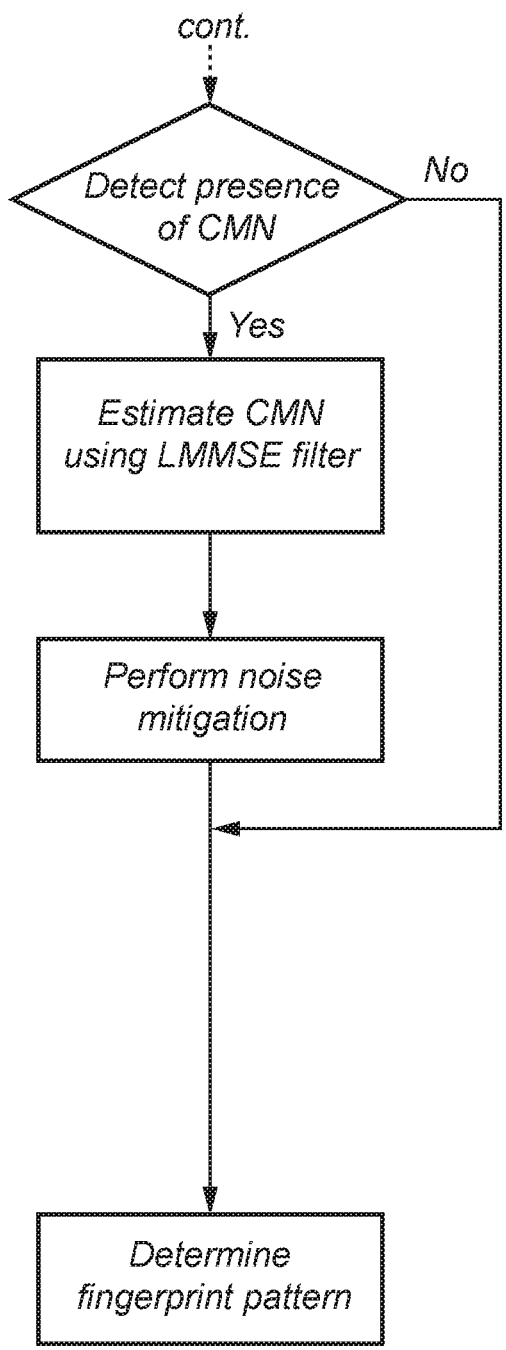
Figure 7D:

Turning now to FIGS. 6A-B and 7A-E in conjunction, where FIG. 6 is a flow chart showing the basic steps according to the invention for determining a fingerprint pattern using fingerprint sensor. FIGS. 7A-7E provides a corresponding functional illustration of some of the method steps. The fingerprint sensor provided in relation to FIG. 7A is a two-dimensional sensor exemplified as having 8×8 pixels. It should be noted that the use of 8×8 pixels is only used for providing a simplified explanation of the inventive method. Thus, any number of pixels may be used. As discussed above in relation to FIG. 3A, such a fingerprint sensor comprises a plurality of sensing element, each sensing element having an output for providing a pixel signal indicative of the capacitive coupling between the corresponding sensing element and a finger. Furthermore, other types of fingerprint sensors may however be used, including for example one-dimensional sensors and sensors employing different sensing techniques.

Following the provision of the fingerprint sensor, fingerprint ($\Sigma_f$) and noise (CMN) ($\Sigma_c$) covariance matrices are selected. Based on the selected covariance matrices, a sampling procedure is determined and specified by a sampling matrix (S) as shown in FIG. 7B. The size of the sampling matrix (S) is defined by the size of the fingerprint sensor and the block size for sampling of a selected few of the sensing elements. In the illustration provided, the sampling size is selected to be four (i.e. sampling of four pixels at a time). According to the discussion provided in relation to Equation 2, the sampling matrix (S) is defined as $$S \in \mathbb{R}^{MN \times \frac{MN}{B}},$$

where M indicates the number of rows of the fingerprint sensor, N indicates the number of columns of the fingerprint sensor and B is the number of pixels sampled at one time. Based on this definition and the exemplifying size of the fingerprint sensor/number of pixels sampled at one time, a sampling matrix (S) is defined as comprising 64 rows and 16 columns.

Accordingly, each of the columns of the sampling matrix shown in FIG. 7B will represent each sensor sampling. In FIG. 7B the sampling pattern is selected to correspond to the sampling strategy shown in FIG. 5B, i.e. a squared block based pattern of 2×2 pixels, sliding from the top left of the sensor to the bottom right of the sensor. The ones shown in FIG. 7B indicate the pixels to be sampled for each sequential sample; zeroes are shown for pixels not being sampled. As indicated in relation to FIGS. 5A-5E, other sampling strategies may be selected, preferably selected in such a way that the amount of noise within the acquired fingerprint image is minimized.

Following setting up the sampling matrix/sampling strategy, the fingerprint sensor is sampled accordingly and a fingerprint image is acquired. As shown in FIG. 7C, the fingerprint image is a noisy image, where the noise pattern is dependent on the block based sequential sampling strategy discussed above.

In accordance to the invention, the noise detection scheme as discussed above in relation to equation 11 and based on the selected sampling matrix is applied for determining the likelihood of noise being present in the acquired fingerprint image. The likelihood is determined by setting up two competing models, the first model being based on the assumption that noise is present, and the other model being based on the assumption that noise is not present. In accordance to the invention, at least the model used where noise is assumed to be present takes into account the selected sampling matrix. It may also be possible to take into account the selected sampling matrix in relation to the model used where noise is assumed not to be present.

A log-likelihood ratio is determined and compared to a predetermined threshold. In case it is determined that the likelihood of noise (in comparison to the threshold) is "too high", the process continues to a step of estimation of the noise, such as CMN, using a LMMSE filter as is discussed above in relation to equations 5-10.

Figure 7E:

Also for setting up the (linear) filter to be used for noise mitigation if noise has been determined to be present will take into account the selected sampling matrix. The acquired, noisy, fingerprint image is subsequently filtered using the "sampling matrix dependent filter", typically being a Wiener filter, and a "clean" image comprising less noise is formed, as is shown in FIG. 7D. As can be seen from FIG. 7D, the "block artifacts" have been removed. Once a less noisy fingerprint image has been formed, it may be possible to better determine a fingerprint pattern as is shown in FIG. 7E, including finding ridges forming e.g. arches, loops, etc., in any manner known to the skilled addressee. Further post processing for determination of a fingerprint pattern is also possible and within the scope of the invention The control functionality of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

In addition, variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

What is claimed is:

1. A method of determining a representation of a fingerprint pattern of a finger captured using a fingerprint sensor comprising a plurality of sensing elements, the method comprising:
    selecting a sampling matrix, wherein the sampling matrix represents a sampling pattern for acquiring a fingerprint image using the fingerprint sensor;
    acquiring the fingerprint image using the fingerprint sensor according to the sampling matrix;
    applying a linear filter to the acquired fingerprint image, wherein setup of the linear filter depends on the sampling matrix and the linear filter is provided for noise reduction within the acquired fingerprint image;
    determining the representation of said fingerprint pattern based on said filtered fingerprint image;
    determining a log-likelihood ratio for noise being present within the fingerprint image,
    comparing the log-likelihood ratio with a predetermined threshold; and
    performing filtering of the fingerprint image only if the log-likelihood ratio is above the predetermined threshold,
    wherein the fingerprint sensor is a two-dimensional fingerprint sensor and the sampling matrix corresponds to a selected portion of the plurality of sensing elements.

2. The method according to claim 1, wherein the selected portion of the plurality of sensing elements are selected as an adjacently arranged group of sensing elements.

3. The method according to claim 1, wherein the selected portion of the plurality of sensing elements are spatially separated over the fingerprint sensor.

4. The method according to claim 1, wherein determining a log-likelihood ratio comprises evaluating a likelihood function for the assumption that noise is not present, and determining the likelihood function for the assumption that noise is present in accordance with the sampling matrix.

5. The method according to claim 1, further comprising applying a non-linear mapping function to the acquired fingerprint image.

6. The method according to claim 5, wherein the non-linear mapping function is a logarithmic function.

7. The method according to claim 1, wherein the linear filter is a Wiener filter.

8. A portable electronic device, comprising:
a fingerprint sensor having an array of pixels, and
a control unit electrically connected to the fingerprint sensor,
wherein the control unit is configured for:
selecting a sampling matrix, wherein the sampling matrix represents a sampling pattern for acquiring a fingerprint image using the fingerprint sensor;
applying a linear filter to the acquired fingerprint image, wherein setup of the linear filter depends on the sampling matrix and the linear filter is provided for noise reduction within the acquired fingerprint image; and
determining a representation of a fingerprint pattern based on said filtered fingerprint image;
determining a log-likelihood ratio for noise being present within the fingerprint image,
comparing the log-likelihood ratio with a predetermined threshold; and
performing filtering of the fingerprint image only if the log-likelihood ratio is above the predetermined threshold,
wherein the fingerprint sensor is a two-dimensional fingerprint sensor and the sampling matrix corresponds to a selected portion of the plurality of sensing elements.

9. The portable electronic device according to claim 8, wherein the fingerprint sensor is employing capacitive sensing technology.

10. The portable electronic device according to claim 8, wherein the fingerprint sensor comprises at least 160×160 pixels.

11. The portable electronic device according to claim 8, wherein the portable electronic device is a mobile phone.

12. A computer program product comprising a non-transitory computer readable medium having stored thereon a computer program for a control unit adapted for controlling a portable electronic device, the portable electronic device comprising a fingerprint sensor and a control unit, wherein the fingerprint sensor is a two-dimensional fingerprint sensor, and
wherein the computer program product comprises:
code for selecting a sampling matrix, wherein the sampling matrix represents a sampling pattern for acquiring a fingerprint image using the fingerprint sensor;
code for acquiring the fingerprint image using the fingerprint sensor and according to the sampling matrix;
code for applying a linear filter to the acquired fingerprint image, wherein setup of the linear filter depends on the sampling matrix and the linear filter is provided for noise reduction within the acquired fingerprint image;
code for determining a representation of a fingerprint pattern based on said filtered fingerprint image;
code for determining a log-likelihood ratio for noise being present within the fingerprint image,
code for comparing the log-likelihood ratio with a predetermined threshold; and
code for performing filtering of the fingerprint image only if the log-likelihood ratio is above the predetermined threshold,
wherein the sampling matrix corresponds to a selected portion of the plurality of sensing elements.

13. The portable electronic device according to claim 8, wherein the fingerprint sensor comprises at least 192×192 pixels.

14. The portable electronic device according to claim 8, wherein the fingerprint sensor comprises at least 208×80 pixels.

* * * * *